United States Patent
Hemashekar et al.

(10) Patent No.: US 9,218,251 B1
(45) Date of Patent: Dec. 22, 2015

(54) METHOD TO PERFORM DISASTER RECOVERY USING BLOCK DATA MOVEMENT

(71) Applicants: Bharath Siddapur Hemashekar, Karnataka (IN); Vaibhav Khanduja, Cupertino, CA (US); Ravi Shankar, Andra Pradesh (IN)

(72) Inventors: Bharath Siddapur Hemashekar, Karnataka (IN); Vaibhav Khanduja, Cupertino, CA (US); Ravi Shankar, Andra Pradesh (IN)

(73) Assignee: EMC Corporation, Hopkinton, MA (US)

( * ) Notice: Subject to any disclaimer, the term of this patent is extended or adjusted under 35 U.S.C. 154(b) by 231 days.

(21) Appl. No.: 13/794,237

(22) Filed: Mar. 11, 2013

(51) Int. Cl.
*G06F 11/14* (2006.01)

(52) U.S. Cl.
CPC ........ *G06F 11/1446* (2013.01); *G06F 11/1458* (2013.01)

(58) Field of Classification Search
CPC .................. G06F 11/1446; G06F 11/1458
USPC .......................................... 714/4.3, 4.4, 6.31
See application file for complete search history.

(56) References Cited

U.S. PATENT DOCUMENTS

| | | | |
|---|---|---|---|
| 6,269,431 B1 * | 7/2001 | Dunham | 711/162 |
| 6,883,076 B1 * | 4/2005 | Ohr | 711/163 |
| 7,024,527 B1 * | 4/2006 | Ohr | 711/161 |
| 7,281,104 B1 * | 10/2007 | Tsypliaev et al. | 711/165 |
| 8,504,529 B1 * | 8/2013 | Zheng et al. | 707/679 |
| 8,621,165 B1 * | 12/2013 | Sridharan et al. | 711/162 |
| 8,924,700 B1 * | 12/2014 | Karmarkar et al. | 713/2 |
| 8,949,197 B2 * | 2/2015 | Wertheimer et al. | 707/678 |
| 2007/0266203 A1 * | 11/2007 | Amano et al. | 711/111 |
| 2010/0049750 A1 * | 2/2010 | Srivastava et al. | 707/202 |
| 2011/0022811 A1 * | 1/2011 | Kirihata et al. | 711/162 |
| 2012/0023146 A1 * | 1/2012 | Shoji et al. | 707/827 |
| 2012/0117342 A1 * | 5/2012 | Karonde et al. | 711/162 |
| 2013/0151802 A1 * | 6/2013 | Bahadure et al. | 711/162 |

* cited by examiner

*Primary Examiner* — Gabriel Chu
*Assistant Examiner* — Paul Contino
(74) *Attorney, Agent, or Firm* — Blakely, Sokoloff, Taylor & Zafman LLP (57) ABSTRACT

A method and system for disaster recovery includes a process for executing a disaster recovery client software on a target system. The disaster recovery client software queries a disaster recovery server with an identifier for the target system, receives a backup volume information for the target system from the disaster recovery server, mounts the backup volume to the target system, and transfers data from the backup volume to a physical volume of the target system using a destructive recovery process with block level data transfer.

20 Claims, 4 Drawing Sheets

METHOD TO PERFORM DISASTER RECOVERY USING BLOCK DATA MOVEMENT

CROSS-REFERENCE TO RELATED APPLICATION

Cross-reference is made to a co-pending patent application by Shankar Balasubramanian for "INCREMENTAL BLOCK BASED BACKUP" filed on Sep. 30, 2011, assigned Ser. No. 13/250,593; co-pending patent application by Shankar Balasubramanian for "BLOCK BASED BACKUP" filed on Sep. 30, 2011, assigned Ser. No. 13/250,637; co-pending patent application by Shankar Balasubramanian for "SYNTHETIC BLOCK BASED BACKUP" filed on Sep. 30, 2011, assigned Ser. No. 13/250,692; co-pending patent application by Shankar Balasubramanian for "RECOVERY FROM BLOCK BASED PHYSICAL TO VIRTUAL CONVERSION" filed on Sep. 30, 2011, assigned Ser. No. 13/250,717, as the present application and commonly owned. The cross-referenced application is incorporated herein by reference.

FIELD OF INVENTION

Embodiments of the present invention relate generally to data recover in response to system failures. More particularly, embodiments of the invention relate to restoring computing devices from backup after system failures using a block data movement process.

BACKGROUND

In modern computer systems, a file system stores and organizes computer files to enable a program to efficiently locate and access requested files. File systems can utilize a storage device such as a hard disk drive to provide local access to data or to utilize a network to provide access to data stored on a remote file server over the network. A file system can also be characterized as a set of abstract data types that are implemented for the storage, hierarchical organization, manipulation, navigation, access, and retrieval of data. The file system software is responsible for organizing files and directories.

Many companies and individuals with large amounts of stored data employ a file system as a data storage system. These data storage systems can be located local to the data to be backed up or at a remote site. The data storage systems can be managed by the entity controlling the data storage devices or a data storage service company. Data can be added to the storage system at any frequency and at any amount.

Data storage systems may offer storage for backup and disaster recovery. Transfer to remote storage may require the transfer of data over a network. A local client data backup application prepares and sends data from the local file system to a backup system. The backup system stores the data received from the local client application to be utilized in the event of a corruption or failure at the computing device executing the local client data backup application.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the Specification to "one embodiment" or "an embodiment" means that a particular feature, structure, or characteristic described in conjunction with the embodiment can be included in at least one embodiment of the invention. The appearances of the phrase "in one embodiment" in various places in the Specification do not necessarily all refer to the same embodiment.

Disaster Recovery (DR) is a process of preparing for recovery or continued operation of technology infrastructure critical to an organization after a disaster that renders a computer inoperable or corrupts the data on the physical disk. One of the critical aspects of DR planning is timely recovery of data and processes following the incident. Organizations develop recovery strategies to ensure that the system downtime is minimal at best, within acceptable limits/threshold and predictable. For reducing outage time, the system should be recovered quickly and effectively following disruption. Currently, time to recover depends on the type of data and the size of critical data. The embodiments present a method and system that can reduce the recover time irrespective of the type of data that is backed up thereby providing a predictable outage window. The method and systems backup the critical volumes/data required for disaster recovery in virtual disk container. The advantages conferred by using virtual disk containers is that they are mountable and hence easily accessible. During the disaster recovery procedure, the backup volume can be mounted on the failed system. Backup data is then available on the failed system as a volume. The handle to the backup volume is opened to get access to the used blocks in the backup volume residing in the mounted virtual container. The used blocks in the virtual container can be copied to the volume on the physical disk of the failed system by a destructive recovery copy process. A destructive recovery or image copy process is block copy process implemented by a module which copies source volume used blocks to a target volume irrespective of the type of source volume file system. After successful completion of the block copy process, the target volume will be an exact replica of the source volume (w.r.t data, file system, directory structure and size of the volume).

The embodiments of the invention include a method and system that utilizes a block copy process, but there are other systems that use a file based restoration process where the backup data is not stored in a directly consumable format (i.e., it is not mountable). In these file based restoration processes, backup data is stored in a proprietary format and hence it can't be utilized to restore a critical volume at the block level. The file based restoration process use proprietary file level recovery procedures with file based backed up data. These file base processes and systems contain two steps First, create all the files on the on target volume on which DR is requested and second, loop through all the files and restore corresponding file data from the backup image. With this approach, supporting the restoring of different level of backups is too complex, it is then required to maintain all the indices of files and their corresponding offset in the backup image.

However, if the file based backup was in a mountable format, then it would be possible to copy the data at the file level. This would lead to lot of seeks and hence reduced performance. When a volume is visualized in terms of blocks, there are only two kinds of blocks: unused blocks and used blocks. During a destructive recovery, only the used blocks are copied. Hence, it is necessary to seek only if unused blocks are present in between used blocks. In case of file level recovery, for every file, it is necessary to get the corresponding blocks of a file and copy it to the destination volume.

The embodiments provide a number of advantages over prior systems such as faster restores. Since the virtual container with the backup volume is mountable, it can directly be mounted such that the backed up can be accessed to do block level copy from the mounted backup source volume to a target volume on the failed system. Copy at the block level is faster than at the file level and also it is unnecessary to create files in the target volume separately. Hence, all the backup volumes can be recovered quickly. Another advantage is the use of the process and system with high density file systems. File level copy has to traverse across the source volume file system and copy each file's data in the volume. This can be a time consuming process, especially for high density file systems, where the number of files can be more than one million. In the case of a block level copy, it is possible to skip a file system layer and directly copy used blocks of the volume.

The embodiments support the utilization special files: With block copy, an exact copy of the backup source volume folder structure will be replicated in a failed or replacement target volume, because the file system metadata can also be the part of the used blocks in the volume. Hence during DR it is not necessary to have any special considerations for special files. The embodiments describe a process that requires less computation. The process and structure support restoring different levels of backups at once. DR will be faster because neither is it necessary to consolidate the indexes of files in full or incrementally nor is it necessary to restore either a full restoration or by incremental restoration. Virtual disk containers can automatically give the latest required view of the volume. This provides access to the data for DR without doing much computation.

The process and system support exact replica: Once the backup is mounted, it contains all the file structure as of that point in time. The only thing remaining to be done is to block level copy the source backup volume to the target volume. After a successful copy the target volume like be the same as the mounted backup image. Since DR will bring back an exact replica of volumes and the entire system and thereby making DR highly reliable for determining a predicatable outage window: In this approach it is not necessary to get the offset location for each and every file, after a mount of the backup image, it is only necessary that the used blocks of the mounted volume be copied.

The embodiments of the process and system utilize the following terms to describe the content of the back up process. 'Block,' is the least or minimum addressable unit of a file system over a volume. A 'Used block' is a set of data that the file system has occupied to store file contents. An 'unused block,' is a block that is free and available for file system. The term 'extent' indicates a range of used blocks (offset and length of contiguous used blocks), and 'extent list' is a variable sized list of extents.

Figure 1:
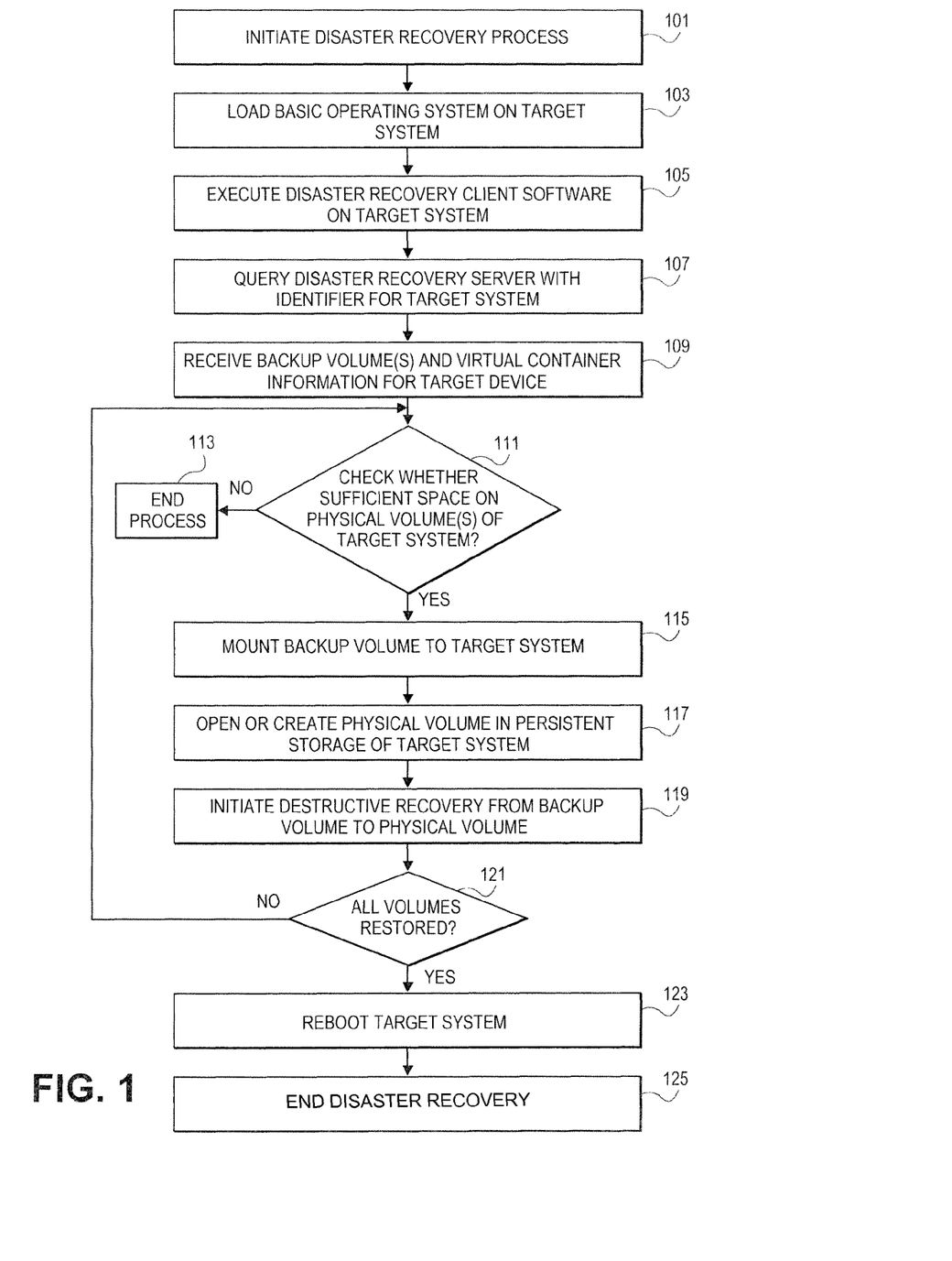
FIG. 1 is a flowchart of one embodiment of block movement data recovery process.

FIG. 1 is a flowchart of one embodiment of block movement data recovery process. In one embodiment, the process is manually or automatically initiated after a disaster or similar event (Block 101). The process can be initiated by loading and executing disaster recovery software on the failed system. The disaster recovery software can be specialized software that establishes communication with a backup and recovery system over a network. The disaster recovery software can run directly on the hardware of the failed system or can run on an operating system. The operating system that is utilized can be a lightweight or thin operating system having a minimum set of functions necessary to start up and recover the failed system. In the cases where a separate operating system is utilized, the operating system is the first aspect of the disaster recovery software that is loaded and executed (Block 103). The disaster recovery software, including any operating system or specialized backup and recovery software, can have any configuration and distribution of functionality over any number of modules. For sake of clarity, the embodiments will be described using an example of disaster recovery software that is divided into a basic operating system and a disaster recovery client.

The basic operating system is distinct from a standard operating system in that it has a minimal set of functions that are implemented that enable the recovery of the failed system. Such functions include basic process management, input/output functionality, network communication functionality and similar functions that facilitate the recovery of the failed system. The basic operating system can be loaded from a protected persistent storage device, a removable medium drive (e.g., a universal serial bus (USB) drive, compact disc (CD) drive or similar drive), over the network or from a similar location accessible to the failed computer system.

Once the operating system is executing or similar functionality has been established for the failed computing system, then the disaster recovery client software can be loaded and executed (Block 105). The disaster recovery client software can provide functionality including communication with a backup and recovery system, virtual container and backup volume mounting, destructive block data transfer and similar processes. The disaster recovery client software can provide a user interface to enable a user direct any portion of the disaster recovery process. In other embodiments, any or all of the disaster recovery can be an automated process. The disaster recovery client software can be loaded from a protected persistent storage device, a removable medium drive (e.g., a universal serial bus (USB) drive, compact disc (CD) drive or similar drive), over the network or from a similar location accessible to the failed computer system.

The disaster recovery client software can establish communication with and query a disaster recovery server at the backup and recovery system (Block 107). The query can include an identifier for the target failed system to enable the disaster recovery server to identify the corresponding backup volume and virtual container for the target failed system. The disaster recovery client software can utilize any communication medium and protocol to communicate with the backup and recovery system to transfer the backup data from the backup and recovery system to the target failed system.

In response to the query, the disaster recovery client software can receive backup volume and virtual container information for the backup data maintained at the backup and recovery system for the target failed system (Block 109). The information can include the size of the backup volume that is to be restored, the number of volumes to be restored and similar information. The information can also include the configuration of the backup volume including a bitmap of used blocks, an extent list and similar information detailing the used blocks of the backup volume. Where a bitmap of used blocks in the backup volume is provided in the information, then an extent list can be derived. The disaster recovery process can be configured to restore all of the backed up data or only critical aspects of the backed up data to minimize the downtime of the target failed system. In one embodiment, this information is utilized to check whether there is sufficient space in the persistent storage device of the failed target device to store the back up volume (Block 111). If there is not sufficient space, then the disaster recovery process can be aborted (Block 113).

If there is sufficient space on the local persistent storage of the failed target system, then the process proceeds by mounting the backup volume and virtual container to the target failed system (Block 115). The mounting of the backup volume treats the backup volume as though the virtual container was a local physical device attached to the target failed system. The backup volume is then accessible through file system operations of the basic operating systems in the same manner that local physical volumes are accessible. A local physical volume to receive data from the mounted backup volume is then either opened or created (Block 117). If the physical volume survived the disaster it can be opened, however if the physical volume was lost, then a new physical volume is created in the local persistent storage of the target failed system. The physical volume is created to have size and similar characteristics that match the backup volume.

Once the physical volume is ready, then the disaster recovery client can initiate a destructive recovery process using a block level data transfer (Block 119). The destructive recovery process transfers data at the block level by transferring extents or consecutive used block ranges and overwriting the physical volume to recreate the backup volume at the target failed device. Once the entire backup volume has been copied to the physical volume, then the physical volume is an exact copy of the backup volume and represents the state of the failed target machine at the time of the last backup to the backup and recovery system. The newly reconstructed physical volume can then be utilized immediately and is capable of being used without the need of the basic operating system or disaster recovery software after a system reboot. After the backup volume copy has completed a check can be made whether any additional volumes are to be copied in the case where the target failed system includes multiple backup volumes (Block 121). If there are additional backup volumes to copy, then the process repeats by checking whether there is sufficient space for the next backup volume (Block 111). When all backup volumes have been transferred where there is sufficient space, then the target failed system can be rebooted to load and execute off the software of the reconstructed physical volumes (Block 123). This then completes the disaster recovery process when the operation of the target failed system has been verified to be functioning after the reboot.

Figure 2:
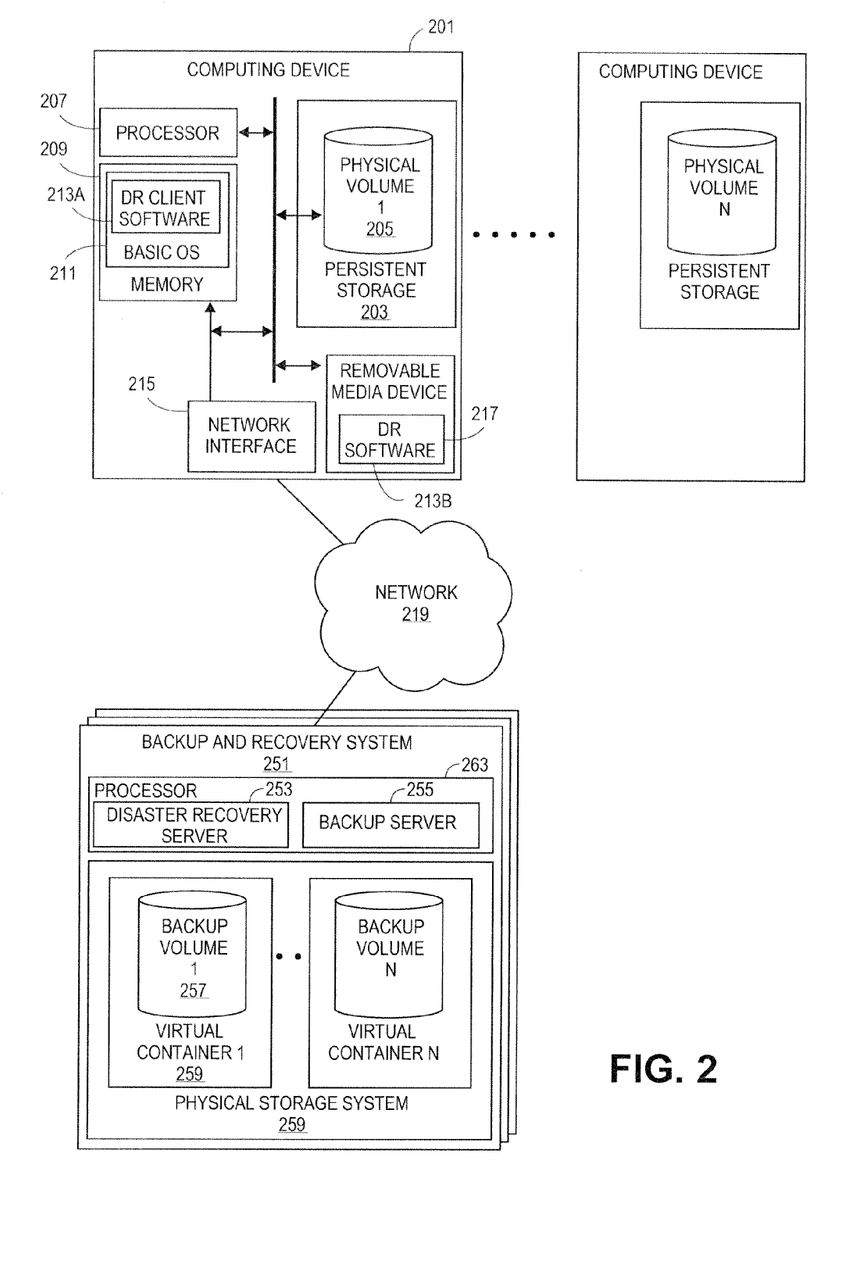
FIG. 2 is a block diagram of one embodiment of a backup data storage and recovery system.

FIG. 2 is a block diagram of one embodiment of a backup data storage and recovery system. In one embodiment, a backup and recovery system 251 is in communication with a set of computing devices 201 over a network 219. A 'set,' a used herein refers to any positive whole number of items including one item. The backup and recovery system 251 can store a set of backup volumes that are block transfer replicas of physical volumes of the computing devices 201 at the time of the last backup.

The backup and recovery system 251 can be a single server machine or can be a set of separate server machines. The backup and recovery system 251 can include a processor 263 and a physical storage system 259 amongst other standard components of a server machine. The processor 253 can be a single processor or a set of processors in a single housing or spread across a set of servers. These processors 263 can execute a disaster recovery server 253 and a backup server 255. The backup server 255 collects the data at defined intervals that is stored in the physical volumes 203 of the computing systems 201 that the backup server 255 services. This data is stored in a set of virtual containers 259 in a physical storage system 259 of the backup and recovery system 251. The virtual containers 259 are virtualized drives that can be mounted to remote computing devices 201. The physical storage system 259 can be composed of any number and type of persistent storage devices such as optical, magnetic or solid state drives.

In one embodiment, the disaster recovery server 253 processes requests and data transfers in coordination with disaster recovery client software 213A,B on the computing systems 201 in the case of a system failure. The disaster recovery server 253 can transfer any backup volume 257 and facilitate the mounting of any virtual container 257 to any of the computing systems 201 upon request from the disaster recovery client software 213A,B. The disaster recovery server 253 can authenticate connection and transfer requests from the disaster recovery client software 213A,B.

The computing systems 201 can be any type of computing devices including desktop devices, server, mobile devices, or similar devices with fixed storage and network capabilities. The computing systems 201 can include a processor 207, memory 211, persistent storage 203, network interface 215, removable media device 217 and similar components. The processor 207 can be a set of processors to execute programs and application within the computing system 201. The memory 211 can be utilized for short term data storage for the programs and applications of the computing system 201. The persistent storage 203 contains a set of physical volumes 205 that include a file system maintained by an operating system of the computing system 201.

The physical volume 205 can have any file system structure, content or organization. The disaster recovery process described herein is compatible with any file system or content. The persistent storage 203 can have any number of physical devices with any amount of storage. This storage can be divided into any number of physical volumes 205. Each of these physical volumes 205 can be backed up on a block by block basis at the backup and recovery system 251 by the backup server 255. In the case of a failure or corruption the physical volumes can be replaced with the corresponding backup volumes to return the computing system 201 to operation in a timely and predictable manner.

The recovery process as described above, is implemented by the disaster recovery client software 213A,B. The disaster recovery client software 213A,B can run on a basic operating system 211 that provides a minimum set of functions for supporting the restarting and restoration of a failed computing system. The operating system 211 and disaster recovery client software 213A,B can be loaded and executed by the processor 207 from memory 211, removable media device 217 or similar location.

A network interface 215 can provide access to the backup and recovery system 251 over a network 219. The computing system 201 can be connected to any number of networks 219 and any type of networks including local area networks, wide area networks, such as the Internet, and similar networks. The computing systems 201 can be connected through either wired or wireless communication mediums.

Figure 3:
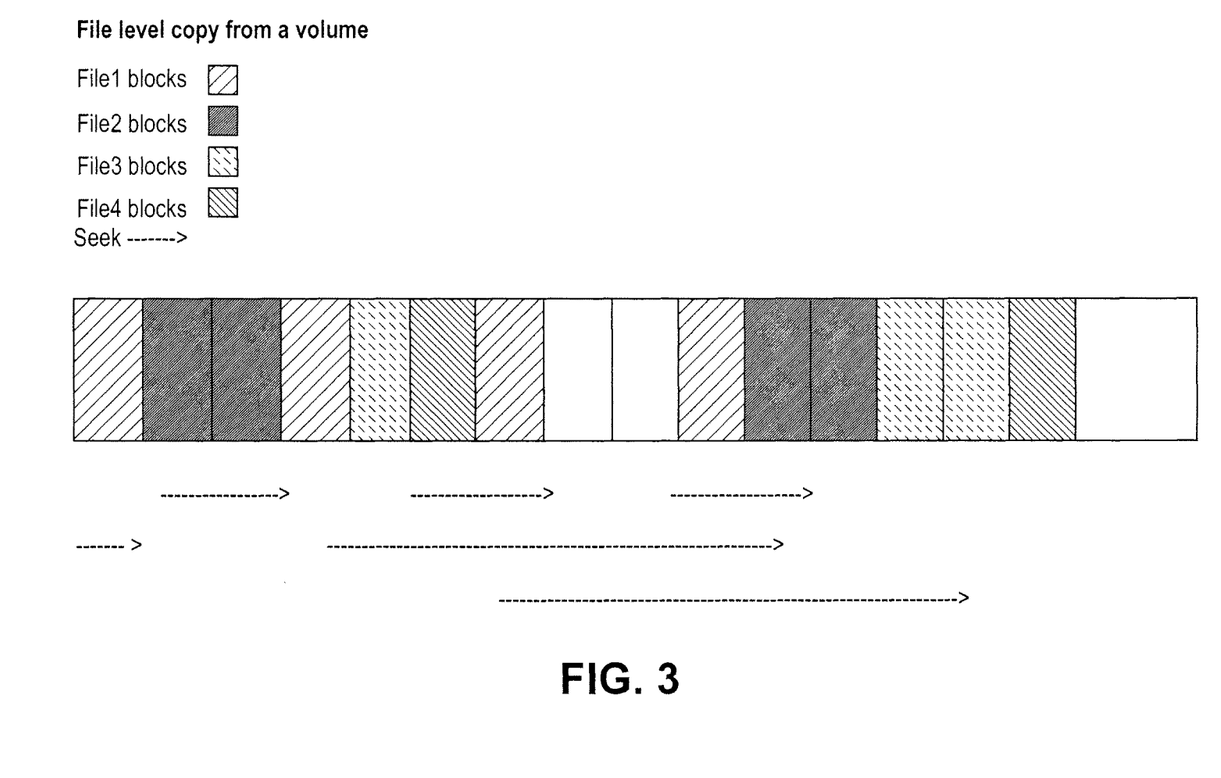
FIG. 3 is a block diagram of one embodiment of a file level copy process of a data recovery storage system.

FIG. 3 is a block diagram of one embodiment of a file level copy process of a data recovery storage system. The diagram illustrates the number of seeks that are required to retrieve and transfer data on a file by file basis in the case of a recovery process using file level transfer. The blocks for a particular file are distributed over the blocks of the storage device shown as a line of consecutive blocks in the diagram. To retrieve file 1, for example, the first block is retrieved then the physical disk must seek to the fourth block and so forth until three seeks are utilized. Seeks are slow in comparison to reading consecutive blocks. So highly fragmented files, that is files with sparsely distributed blocks, take longer to retrieve than tightly grouped files. To retrieve all four files in the example, a large number of seeks are needed. Extrapolated over a large data set such as a backup process this leads to serious performance issues. Specifically if the system copy each of the files from this illustrated volume it would need 8 seeks. To fetch file 1 it would need 3 seeks. To fetch file2 it would need 2 seeks. And to fetch file3 it would need 3 seeks. Since the number of seeks are high, a block level copy of data is faster.

Figure 4:
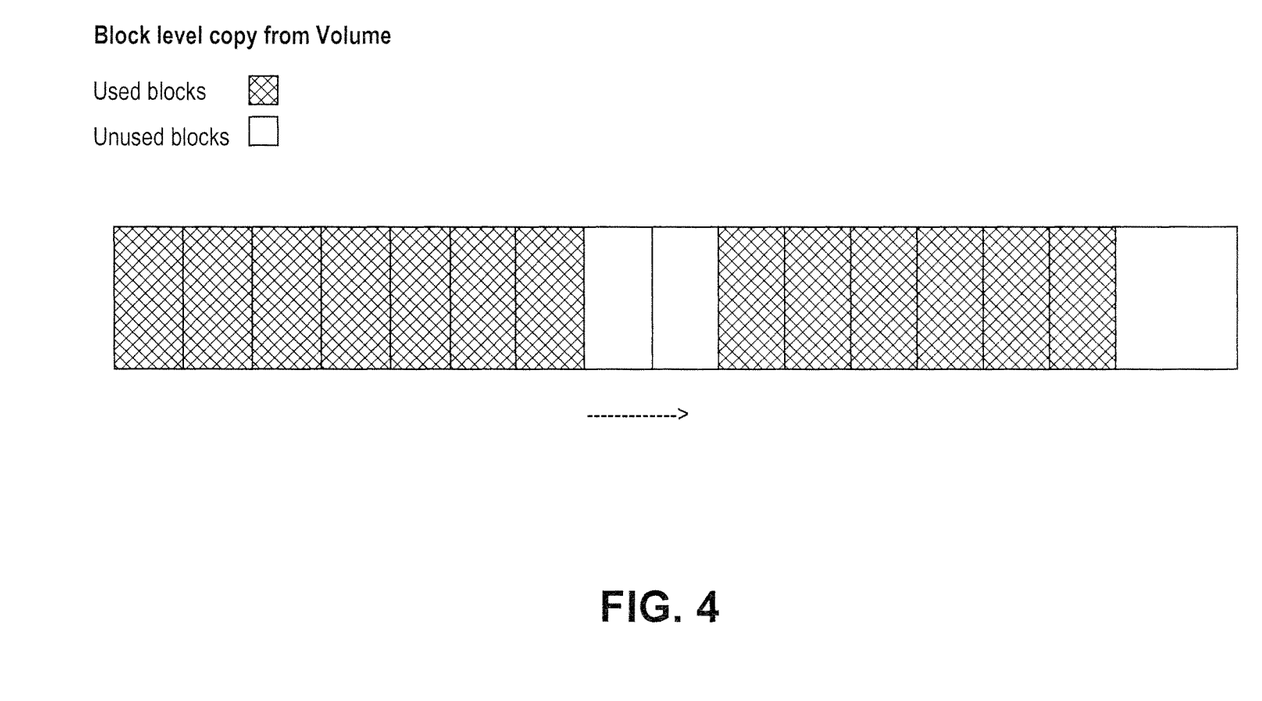
FIG. 4 is a block diagram of one embodiment of a block level copy process of a data recovery storage system.

FIG. 4 is a block diagram of one embodiment of a block level copy process of a data recovery storage system. With a block level copy, the file organization and distribution is ignored. The process transfers all used blocks to recreate the entire file system when the transfer is complete as the file structure is inherently maintained even it if isn't explicitly utilized. In the illustrated example only a single seek is required. The block level copy process copies each extent of a source backup volume to a target physical volume at the same extent offset. In other words, the location of each extent is the same in both the source and target by maintaining the offsets thereby skipping the copy of the unused blocks but keeping the accurate spacing. The result is a target physical volume that is identical to the backup volume in the virtual container. Since the backup volume has point in time backup of the data prior to the event that disabled the computer system, there is an exact replica of all critical data for the system to be able to function as it was functioning at that time. Overall this is 150% faster than the file level copy and significantly reduced the outage of the computing system.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein.

In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. A computed-implemented method for a disaster recovery of data, the method comprising:

executing a disaster recovery client software executed by a processor on a target system;

querying, by the disaster recovery client software, a disaster recovery server with an identifier for the target system, including transmitting the identifier of the target system from the target system over a network to the disaster recovery server, wherein the identifier uniquely identifies the target system;

receiving, by the disaster recovery client software at the target system, a backup volume information and a virtual container information for the target system from the disaster recovery server, wherein the backup volume information of a backup volume and the virtual container information are identified by the disaster recovery server based on the identifier of the target system;

determining whether there is a sufficient storage space in a physical volume of the target system to restore the backup volume based on the backup volume information;

in response to determining that there is sufficient storage space, mounting a virtual container containing the backup volume to the target system based on the virtual container information to allow the target system to access the backup volume of the virtual container maintained by the disaster recovery server over a network, wherein the backup volume is accessible by the target system as if it is a local storage volume; and transferring data from the backup volume contained in the virtual container to the physical volume of the target system using a destructive recovery process with block level data transfer, including traversing the backup volume in the virtual container at a block level with a plurality of offsets within the backup volume to identify one or more blocks that contain data therein, and copying only blocks that contain data to the physical volume of the target system, regardless of which files the blocks are associated with.

2. The method of claim 1, further comprising:
loading a basic operating system on the target system.

3. The method of claim 1, wherein the backup volume information contains a size of the backup volume and a number of volumes to be restored from the disaster recovery server.

4. The method of claim 1, further comprising:
creating the physical volume on the target system with a size matching the backup volume.

5. The method of claim 1, further comprising:
rebooting the target system to execute from the physical volume.

6. The method of claim 1, wherein the backup volume information includes a bitmap of used blocks in the backup volume.

7. The method of claim 6, further comprising:
generating an extent list from the bitmap.

8. The method of claim 7, further comprising:
transferring each extent on the extent list from the backup volume to the physical volume using a same offset location in the physical volume as used in the backup volume for each extent.

9. A computer system comprising:
a network interface to enable data transfer over a network and communication with a disaster recovery server;
a persistent storage device; and
a processor coupled to the network interface and persistent storage devices, the processor configured to
execute a disaster recovery client software, to query, by the disaster recovery client software, the disaster recovery server with an identifier for the computer system, including transmitting the identifier of the target system from the target system over the network to the disaster recovery server, wherein the identifier uniquely identifies the target system,
receive, by the disaster recovery client software at the target system, a backup volume information and a virtual container information for the computer system from the disaster recovery server, wherein the backup volume information of a backup volume and the virtual container information are identified by the disaster recovery server based on the identifier of the target system,
determine whether there is a sufficient storage space in a physical volume of the target system to restore the backup volume based on the backup volume information,
in response to determining that there is sufficient storage space, mount a virtual container containing the backup volume to the computer system based on the virtual container information to allow the target system to access the backup volume of the virtual container maintained by the disaster recovery server over a network, wherein the backup volume is accessible by the target system as if it is a local storage volume, and
transfer data from the backup volume contained in the virtual container to a physical volume of the persistent storage device using a destructive recovery process with block level data transfer, including traversing the backup volume in the virtual container at a block level with a plurality of offsets within the backup volume to identify one or more blocks that contain data therein, and copying only blocks that contain data to the physical volume of the target system, regardless of which files the blocks are associated with.

10. The computer system of claim 9, wherein the processor is further configured to load a basic operating system.

11. The computer system of claim 9, wherein the backup volume information contains a size of the backup volume and a number of volumes to be restored from the disaster recovery server.

12. The computer system of claim 9, wherein the processor is further configured to create the physical volume with a size matching the backup volume.

13. The computer system of claim 9, wherein the processor is further configured to rebooting the computer system to execute from the physical volume.

14. The computer system of claim 9, wherein the backup volume information includes a bitmap of used blocks in the backup volume.

15. The computer system of claim 14, wherein the processor is further configured to generate an extent list from the bitmap.

16. The computer system of claim 15, wherein the processor is further configured to transfer each extent on the extent list from the backup volume to the physical volume using a same offset location in the physical volume as used in the backup volume for each extent.

17. A non-transitory machine-readable medium having instructions stored therein, which when executed by a processor, cause the processor to perform operations, the operations comprising:
executing a disaster recovery client software executed on a target system;
querying, by the client recovery client software at the target system, a disaster recovery server with an identifier and a virtual container information for the target system, including transmitting the identifier of the target system from the target system over a network to the disaster recovery server, wherein the identifier uniquely identifies the target system;
receiving, by the client recovery client software at the target system, a backup volume information and a virtual container information for the target system from the disaster recovery server, wherein the backup volume information of a backup volume and the virtual container information are identified by the disaster recovery server based on the identifier of the target system;
determining whether there is a sufficient storage space in a physical volume of the target system to restore the backup volume based on the backup volume information;
in response to determining that there is sufficient storage space, mounting a virtual container containing the backup volume to the target system based on the virtual container information to allow the target system to access the backup volume of the virtual container maintained by the disaster recovery server over a network, wherein the backup volume is accessible by the target system as if it is a local storage volume; and
transferring data from the backup volume contained in the virtual container to the physical volume of the target system using a destructive recovery process with block level data transfer, including traversing the backup volume in the virtual container at a block level with a plurality of offsets within the backup volume to identify one or more blocks that contain data therein, and copying only blocks that contain data to the physical volume of the target system, regardless of which files the blocks are associated with.

18. The non-transitory machine-readable medium of claim 17, wherein the operations further comprise:

loading a basic operating system on the target system.

19. The non-transitory machine-readable medium of claim 17, wherein the backup volume information contains a size of the backup volume and a number of volumes to be restored from the disaster recovery server.

20. The non-transitory machine-readable medium of claim 17, wherein the operations further comprise:

creating the physical volume on the target system with a size matching the backup volume.

* * * * *